United States Patent [19]

Jones

[11] 3,748,397

[45] July 24, 1973

[54] PORTABLE REMOTE BROADCASTING TELEPHONE SYSTEM

[76] Inventor: Clarence E. Jones, P.O. Box 458, Saint George, S.C. 29477

[22] Filed: May 10, 1972

[21] Appl. No.: 251,924

[52] U.S. Cl. .................. 179/2 C, 179/2 E, 179/1 B, 179/1 PC

[51] Int. Cl. .................. H04h 1/08

[58] Field of Search .................. 179/1 C, 1 A, 1 D, 179/1 HS, 1 PC, 1 SW, 2 R, 2 E, 2 C, 41 A, 1 B

[56] References Cited

UNITED STATES PATENTS

| | | | |
|---|---|---|---|
| 2,501,955 | 3/1950 | McWane | 179/1 C |
| 2,616,973 | 11/1952 | Mantz | 179/2 E |
| 3,217,254 | 11/1965 | Hughes | 179/1 C |

*Primary Examiner*—Ralph D. Blakeslee
*Attorney*—Roberts B. Larson, Ross F. Hunt, Jr. et al.

[57] ABSTRACT

A portable remote broadcasting telephone system for relaying a high quality sound reproduction to a distant broadcasting station over telephone lines. The system comprises a telephone, a high quality microphone, solid state amplification circuitry contained within the telephone housing and a portable carrying case. A double-pole double-throw switch selectively connects the amplification circuitry and the telephone to the telephone lines and, irrespective of the position of the switch, permits the presence of an incoming call to be detected. The microphone is coupled to the amplifier through a plug and jack connection, which, when made, prevents the inadvertant use of the telephone handset in disconnecting the telephone.

9 Claims, 3 Drawing Figures

PORTABLE REMOTE BROADCASTING TELEPHONE SYSTEM

BACKGROUND OF THE INVENTION

1. Field of the Invention

This invention relates to composite telephone communication systems and more particularly to a portable communications system for relaying a high quality sound reproduction to a distant broadcasting station over telephone lines.

2. Description of the Prior Art

Radio broadcasting requires high fidelity sound reproduction which is easily obtainable in a broadcast studio through the use of expensive, heavy electronic equipment. However, as the emphasis in radio broadcasting is shifted to on-the-spot reporting of events as they occur, radio broadcasts are being made with increasing frequency from locations other than the broadcast studio. In order to meet the high fidelity sound requirements, heavy bulky multi-unit electronic equipment must be transported to the broadcast location and, in a time consuming operation, set up and tested. Occasionally, the electronic equipment is permanently installed in trucks and the microphones used for broadcasting, often located at a distance from the equipment, are connected thereto through long cables. Radio broadcasts can also be made through telephones whereby the telephone at the station is "patched" into the broadcast equipment. The major disadvantage of broadcasting through a telephone is that the carbon microphone used in the telephone is subject to highly undesirable defects, such as carbon noise, packing, deterioration with age, positional defects, non-linear distortion, and impression of modulation products. Furthermore, telephones require that the handset be held and that the speaker talk directly into the mouthpiece, thereby limiting his freedom for other activities.

The advantages of broadcasting from telephones include their wide-spread availability and their minimal cost. In addition, in many rural areas of the country many people are unable to attend local functions, such as religious services, sporting activities, and meetings, because of the travel requirements involved. These rural areas are populated with local radio broadcasting stations that operate on very low budgets that require inexpensive on-the-spot broadcasting. Of course, programs could be taped for later broadcasting at the broadcast studio, but this procedure precludes instant reporting of events as the events occur.

A number of the local radio broadcasting stations also feature technically untrained local personalities in regularly scheduled programs. These personalities include members of the clergy who give "radio sermons" and other people who can conveniently broadcast from their homes or places of business. However, the technically untrained personalities can not operate the complex electrical equipment which is required to make a broadcast outside of the broadcast studio, and the radio broadcasting stations can not afford to send trained personnel to assist them in making the broadcast from their homes or places of business.

Hence, the need exists for a high qualify, remote radio broadcasting system that is readily portable, inexpensive, uncomplicated and easy to use.

SUMMARY OF THE INVENTION

According to the present invention, a portable, lightweight, inexpensive remote broadcasting system is provided which is capable of transmitting a high quality sound reproduction to a distant broadcasting station over conventional telephone lines. The system includes a unitary container, such as a converted or modified attache case, that has been designed to hold all the elements required to make the remote broadcast.

The preferred embodiment of the invention comprises, in combination, a telephone, means for connecting the telephone to the telephone lines, a high quality microphone, solid state amplification circuitry, means for connecting the microphone to the amplification circuitry, switch means for selectively connecting the amplification circuitry and the telephone to the telephone wires through the telephone connecting means, and a portable carrying case that is adapted to hold the aforementioned components. The amplification circuitry comprises an operational amplifier; means connectable to an external power supply for energizing the amplifier; means for applying an input signal from the microphone to the amplifier and including an interference filter; means for controlling the gain of the amplifier; means for attenuating the output signal; and impedance matching means connected between the amplifier and the attenuating means. The microphone connecting means comprises a conductor connected at one end to the microphone; a plug connected to the other end of the conductor; a jack mounted on the telephone housing for receiving the plug and located on the telephone housing such that the plug, when inserted into the jack, prevents the telephone handset from actuating the telephone disconnecting means; and a conductor connecting the jack to the amplifier.

Other features and advantages of the present invention will be set forth in or apparent from the detailed description of the preferred embodiment of the invention found hereinbelow.

DESCRIPTION OF THE PREFERRED EMBODIMENT

Figure 1:
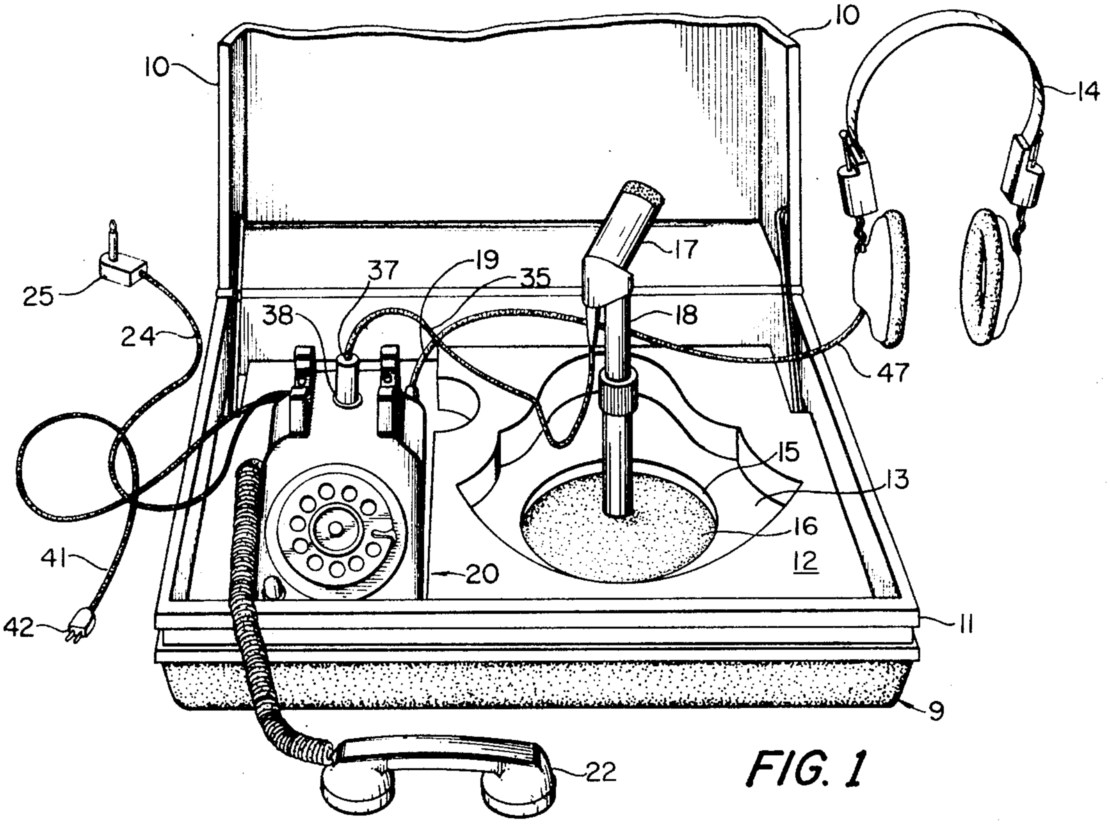
FIG. 1 is a perspective view of a preferred embodiment of the invention in a partially assembled state showing the interconnections between the various elements of the invention.

Referring to the drawings where like numbers refer to like parts in the several figures, and more particularly referring to FIG. 1, a portable carrying case 9, having a top section 10 and a bottom section 11, is shown in the open position containing the remaining elements of the system connected together and substantially ready for use. Contained in bottom section 11 is a form 12, that can be made of, for example, foamed polyurethane, foamed polystyrene, or similar rigid foamed plastic material. Cut out of form 12 are a number of holders or receptacles, including a curvilinear receptacle 13 for holding a headset 14, a cylindrical receptacle 15, which is located within curvilinear receptacle 13, for holding the base 16 of a microphone 17 that is supported from base 16 by a stand 18, and a substantially square receptacle 19 for holding a telephone 20.

Figure 2:
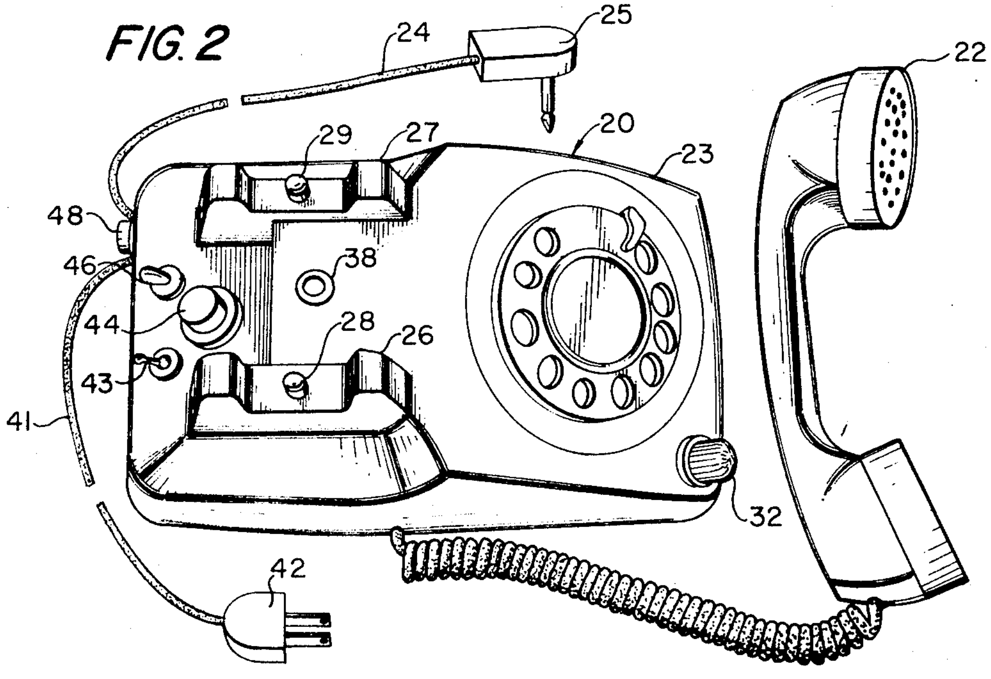
FIG. 2 is a perspective view from the top showing the telephone of FIG. 1 in greater detail.

Telephone 20 is of conventional construction with the exceptions set forth below and, as best seen in FIGS. 1 and 2, includes a handset 22, a housing 23 and a connector or cord 24 having a plug 25, connected to the end thereof, for connecting telephone 20 to telephone lines, not shown. Located at the top of housing 23 are a pair of bifurcated cradle arms 26 and 27 for holding handset 22 when telephone 20 is not being used. A disconnect means for electrically disconnecting telephone 20 from the telephone lines is comprised of a hook switch, not shown, having a pair of spring raised, depressable actuating buttons 28 and 29 extending above housing 23 and respectively located between the bifurcated parts of cradle arms 26 and 27. The hook switch is actuated and telephone 20 is electrically disconnected by the placement of handset 22 on cradle arms 25 and 26 with the resulting depression of buttons 28 and 29. An incoming call to telephone 20 is indicated by the energizing of a light 32 located on the front panel of housing 23.

Microphone 17 is connected to amplification circuitry, located inside housing 23 and described hereinbelow, through a connector or cord 35, one end of cord 35 is connect to microphone 17 and the other end is connect to a plug 37. Plug 37 can be inserted into a jack 38, that is, in turn, electrically connected to the amplification circuitry mentioned above, to complete the connection. To prevent inadvertant disconnecting of telephone 20 from the telephone lines through the placement of handset 22 on cradle arms 26 and 27 will the resultant actuation of the hook switch by the depression of buttons 28 and 29, jack 38 is located at the top of housing 23 between cradle arms 26 and 27. Thus, when plug 37 is inserted in jack 38, hand set 22 cannot be placed on cradle arms 26 and 27 and telephone 20 cannot be inadvertantly disconnected from the telephone lines thereby.

The above mentioned amplification circuitry is energized through a cord 41 and a plug 42 which is connectable into any conventional household outlet. A power control switch 43, located at the back of housing 23, controls the power to the amplification circuitry and when positioned in the "on" position, a power indicating light 44 is energized. A double-pole double-throw selector switch 46 selectively connects telephone 20 or microphone 17 through the amplification circuitry to the telephone lines through cord 24 and plug 25. Headset 14, which can be used for monitoring the output of the amplification circuitry when microphone 17 is being used, is connected to the amplification circuitry through a cord 47 that can be connected with a jack 48 located at the back of housing 23.

From the above description it is readily apparent that all components of the remote broadcasting telephone system can be easily and quickly interconnected to set up the system for broadcasting by a person without any technical training.

Figure 3:
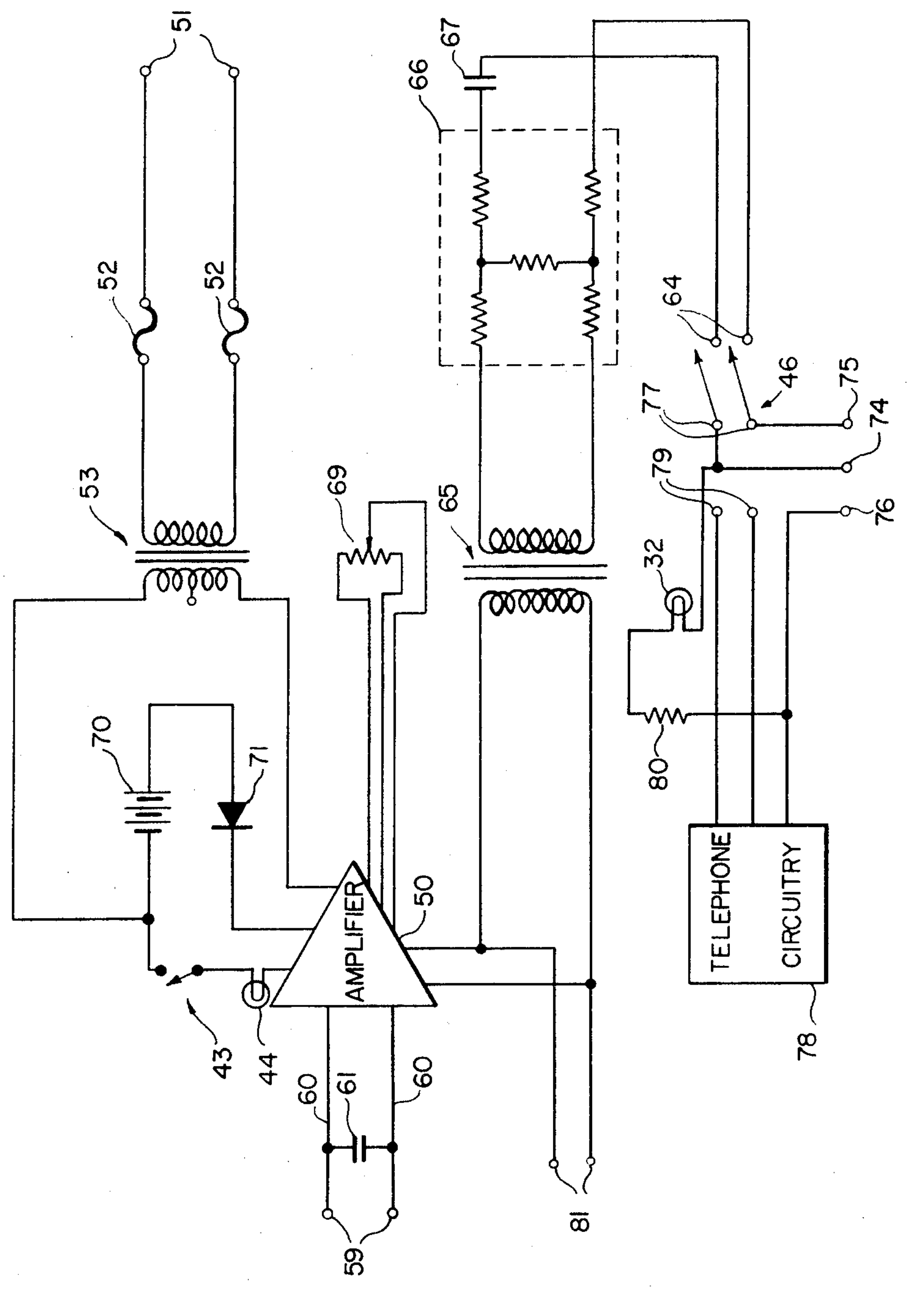
FIG. 3 is a schematic circuit diagram of the circuitry utilized in the invention.

The amplification circuitry referred to above is shown in FIG. 3. An operational amplifier 50 is connected to an external source of power through terminals 51, in-line fuses 52, a step down transformer 53, and the power control switch 43 and power indicating light 44 referred to above. An input signal, such as from microphone 17 in FIG. 1, is connected to operational amplifier 50 through input terminals 59 and conductors 60. A filter capacitor 61, used in filtering out undesirable frequencies, is connected across conductors 60. The output of amplifier 50 is connected to a first pair of terminals 64 of selector switch 46 through an output impedance matching means, such as transformer 65, an attenuator circuit 66 and a coupling capacitor 67. Adjustment of the gain of amplifier 50 can be made by varying the resistance of a gain control resistor 69. Attenuator circuit 66 provides a means for reducing the output power of amplifier 50 so as to prevent an overloading of the telephone lines.

In order to increase portability of the remote broadcasting telephone system, power to the amplification circuits can also be provided from an internal power supply. A battery 70, connected in series with and forwardly biasing a diode 71, is connected to amplifier 50 in parallel with transformer 53. If amplifier 50 is receiving power from transformer 53, i.e., from the external power source, diode 71 is back biased, thereby preventing battery 70 from supplying current, and hence power, to amplifier 50. However, if amplifier 50 is not receiving power from the external power source, diode 71 is forward biased by battery 70 and amplifier 50 is automatically supplied with power from battery 70.

Selector switch 46, as discussed above, connects either the output of amplifier 50 or the output of telephone 20 to the telephone lines (see FIG. 1). Conventional telephone lines contain at least 3 wires, one wire used exclusively for a telephone ringing circuit, one wire used exclusively for carrying, for example, a conversation and a common wire used jointly in connection with the other two aforementioned wires. The telephone line and the three aforementioned wires are connected through plug 25 and cord 26 (see FIG. 1) to three connecting terminals 74, 75 and 76, the common wire and conversation carrying wire being connected respectively to connecting terminals 74 and 75, which are in turn connected to the center terminals 77 of selector switch 46. The ringing circuit wire is connected directly to the telephone circuitry, represented by block 78, through connecting terminal 76, thereby bypassing selector switch 46. Thus, with selector switch 46 in a first position in contact with first pair of terminals 64, amplifier 50 is connected to center terminals 77 of selector switch 46, and ultimately is connected to the telephone lines. With selector switch 46 in a second position in contact with a second pair of terminals 79, telephone circuitry 78 is connected to center terminals 77 of selector switch 46 and ultimately is connected to the telephone lines as discussed above. Headset 14, through cord 47, shown in FIG. 1, is connected at a pair of terminals 81, which are in turn connected to the amplifier 50 side of isolation transforms 65.

Irrespective of the position of selector switch 46, an incoming call can be indicated by light 32. Light 32, in series with a resistor 80, is connected across connecting terminals 76 and 74 and thus is connected directly to the telephone lines and energized therefrom to indicate an incoming call.

The broadcasting telephone system can be easily transported in carrying case 9 and set up for use in a very short time. Upon arrival at a broadcasting location, telephone 20 is connected to the telephone lines by inserting plug 25 into a suitable telephone receptacle, not shown, such as a QKT 30-A voice coupler. If a conventional 120 volt electrical outlet is available, plug 42 is inserted therein to provide power for the amplification circuitry. Alternatively, as described above, in the absence of an external power supply, the amplification circuitry can receive power from battery 55.

A remote broadcast can now be made by establishing telephone contact with the radio station. Selector switch 46 is positioned to the second position, making contact with terminals 79 and connecting telephone circuitry 78 to the telephone lines. Handset 22 is removed from cradle arms 26 and 27 thereby permitting buttons 28 and 29 to be forced upwardly and actuating the hook switch to complete the electrical connection of telephone 20 to the telephone lines. Removing handset 22 from cradle arms 26 and 27 also uncovers jack 38 permitting microphone 17 to be connected to the amplification circuitry which is then accomplished by inserting plug 37 into jack 38. Telephone 20 is then used in a conventional manner to place a telephone call to the broadcast station, and after the broadcast station has "patched" the telephone call to either recording equipment or broadcast equipment, the remote broadcast is made by speaking through microphone 17 after positioning selector switch 46 to the first position making contact with terminals 64 and connecting the amplification circuitry to the telephone lines. The remote broadcast is monitored by connecting headset 14 to the output of amplifier 50 by plugging cord 47 into jack 48.

Thus, the invention provides the ability to make a high quality radio broadcast from a location remote from the broadcast station by using conventional telephone lines to transmit the broadcast from the remote location to the broadcast station. The broadcast can be made without the assistance of technically trained personnel and without the use of expensive electronic equipment at the broadcast location. Furthermore, as long as microphone 17 is connected to the amplification circuitry through the connection made between plug 37 and jack 38, handset 22 cannot be inadvertantly replaced on cradle arms 26 and 27, thereby disconnecting telephone 20 from the telephone lines. The portability of the remote broadcasting telephone system is enhanced through the use of specially constructed carrying case 9 that contains the remaining elements of the system and through the provision of an internal power supply that is automatically connected into the amplification circuitry in the absence of power from an external power supply.

Although the invention has been described in detail with respect to an exemplary embodiment thereof, it will be understood by those of ordinary skill in the art that variations and modifications may be effected within the scope and spirit of the invention.

I claim:

1. A portable, remote broadcasting telephone system for use in relaying a high quality reproduction of a sound to a radio broadcasting station over conventional telephone lines, said system comprising in combination:

a telephone that includes a handset, a housing having means for holding said handset, means for electrically disconnecting said telephone from the telephone lines, said disconnecting means being actuated by the placement of said handset on said holding means thereby electrically disconnecting said telephone, and means for indicating an incoming call;

means for connecting said telephone to the telephone lines;

a microphone;

solid state amplification circuitry comprising an operational amplifier, means connectable to an external power supply for energizing said amplifier, means for applying an input signal to said amplifier, said means including an interference filter, means for controlling the gain of said amplifier, means for attenuating the output signal and impedance matching means connected between said amplifier and said attenuating means for matching the combined impedance of said attenuating means and the telephone lines;

means for connecting said microphone to said amplifier, said means including a conductor connected at one end to said microphone, a plug connected to the other end of said conductor, a jack mounted on said telephone housing for receiving said plug, said jack being located on said housing such that said plug, when inserted into said jack prevents said handset from actuating said disconnecting means, and a conductor connecting said jack to said amplifier;

switch means for selectively connecting said amplification circuitry and said telephone to said telephone connecting means and for connecting said incoming call indicating means to said telephone lines when said switch means is positioned to connect said amplification circuitry to the telephone lines; and a portable carrying case for containing said telephone, said telephone connecting means, said microphone, said amplification circuitry, said microphone connecting means and said switch means.

2. A remote broadcasting telephone system in accordance with claim 1 wherein said amplification circuitry and said switch means are contained within said telephone housing.

3. A remote broadcasting telephone system in accordance with claim 1 and further including an internal emergency power supply connected to said amplification circuitry in parallel with said external power supply, said internal power supply including a diode connected in series with a battery such that said diode is back biased when said amplifier is connected to said external power supply thereby preventing said battery from supplying current to said amplifier and such that said battery energizes said amplifier when said amplifier is disconnected from said external power supply.

4. A remote broadcasting telephone system in accordance with claim 1 wherein said indicating means comprises a light.

5. A remote broadcasting telephone system in accordance with claim 1 and further including a headset monitoring means for monitoring the output of said amplifier.

6. A remote broadcasting telephone system in accordance with claim 5 wherein said carrying case contains a form having a first receptacle therein for holding said telephone, a second receptacle therein for holding said microphone and a third receptacle therein for holding said headset monitoring means.

7. A portable, remote broadcasting telephone system for use in relaying a high quality reproduction of a sound to a radio broadcasting station over conventional telephone lines, said system comprising in combination:

a telephone that includes a handset, a housing having means for holding said handset, means for electrically disconnecting said telephone from the telephone lines, said disconnecting means being actuated by the placement of said handset on said holding means thereby electrically disconnecting said telephone, and means for indicating an incoming call;

means for connecting said telephone to the telephone lines;

a microphone;

solid state amplification circuity including an operational amplifier and means connectable to an external power supply for energizing said amplifier;

means for connecting said microphone to said amplifier, said means including a conductor connected at one end to said microphone, a plug connected to the other end of said conductor, a jack mounted on said telephone housing for receiving said plug, said jack being located on said housing such that said plug when inserted into said jack prevents said handset from actuating said disconnecting means, and a conductor connecting said jack to said amplifier;

switch means for selectively connecting said amplification circuitry and said telephone to said telephone connecting means and for connecting said incoming call indicating means to said telephone lines when said switch means is positioned to connect said amplification circuitry to the telephone lines;

headset monitoring means for monitoring the output of said amplifier; and a portable carrying case containing a form having a first receptacle therein for holding said telephone, a second receptacle therein for holding said microphone and a third receptacle therein for holding said headset monitoring means.

8. A remote broadcasting telephone system in accordance with claim 7 wherein said amplification circuitry and said switch means are contained within said telephone housing.

9. A remote broadcasting telephone system in accordance with claim 7 and further including an internal emergency power supply connected to said amplification circuitry in parallel with said external power supply, said internal power supply including a diode connected in series with a battery such that said diode is back biased when said amplifier is connected to said external power supply thereby preventing said battery from supplying current to said amplifier and such that said battery energizes said amplifier when said amplifier is disconnected from said external power supply.

* * * * *